United States Patent Office 2,855,318
Patented Oct. 7, 1958

2,855,318

BINDING COMPOSITIONS AND REFRACTORY MATERIALS BOUND THEREBY

Hans Kerla, Baltimore, Md.

No Drawing. Application June 15, 1956
Serial No. 591,537

6 Claims. (Cl. 106—55)

The present invention relates to the production of liquid binding compositions for organic and inorganic particles and aggregates which can be kept in closed containers for long periods of time without gelation.

This application is a continuation-in-part of my application Serial No. 190,050, filed October 13, 1950, now abandoned.

An object of this invention is to provide a liquid binding composition that is insensitive to frost.

Another object of this invention is to provide a liquid binding composition that may be stored in closed containers without precipitation or coagulation, and which is especially adapted for binding organic and inorganic substances, having in themselves no binding properties.

Still another object of this invention is to provide a liquid binding composition that may be used for binding calcined and fused refractory aggregates, ores, and the various types of carbides.

Another object of this invention is to provide a liquid binding composition ball milled with acid, basic or neutral aggregates to brush consistency and applying this material as one or more films to metallurgical containers or furnaces to eliminate erosion thereof by the molten metals.

A further object of this invention is to provide a liquid binding composition that may be used for binding organic substances, such as, granulated crude cork, cork sawdust, woodflour, etc., for producing fire resistant insulation material.

Still another object of this invention is to provide a liquid binding material that may be used for binding crystalline materials to produce refractory materials without resorting to recrystallization.

The principal object of this invention relates to the exclusive employment of the binding compositions in conjunction with refractory aggregates for the production of solid materials upon mechanical compression of the admixture into molds or ramming into frames. The compressed or rammed mixture of liquid binder and aggregate becomes solid at temperatures as low as 150 degrees C. which may be raised to the extent required by service conditions. The materials thus produced have strength comparable to kiln fired products. These materials also have the improved characteristic in that there is no tendency to generation of steam therein causing cracking of the material under service conditions.

Furthermore, organic materials, such as, crude cork, cork sawdust, woodflour, etc., mixed with the binding compositions to trowel consistency, are applicable to any surfaces, such as, for insulation and fire-retarding, when applied to wood.

I am well aware that many attempts heretofore have been made to utilize alkali silicates in liquid form as base ingredient of binding composition with the assistance of acids. However, improper modification of such silicates generate steam when exposed to elevated temperatures. When such material is employed as a binding medium for the production of solid materials, the steam generated in the binding material when it is heated causes separation of the components and ultimately disintegrates the material. Pigmented binding compositions, when applied as films to heat resisting surfaces form blisters for the same reason and peeling of the films.

Alkali metal silicates represent a loosely joined combination of alkali metal hydroxides and silica of various ratio of alkali to silica, as shown in the following table:

| (Ratio in percent) $Na_2O:SiO_2$ | $Na_2O$ | $SiO_2$ | $H_2O$ | Spec. Gr. | Degree Bé. |
|---|---|---|---|---|---|
| 1:3.90 | 6.3 | 24.6 | 69.1 | 1.300 | 33.5 |
| 1:3.22 | 8.9 | 28.7 | 62.4 | 1.394 | 41 |
| 1:2.90 | 11 | 31.9 | 57.1 | 1.480 | 47 |
| 1:2.40 | 13.8 | 33.1 | 53.1 | 1.599 | 52 |
| 1:1.60 | 19.5 | 31.2 | 49.3 | 1.676 | 58.5 |
| 1:1.60 | 24.2 | 38.7 | 37.1 | 1.871 | 67.5 |

In order to produce satisfactory binding compositions from commercial sodium silicates solutions, the recombination of their ions is necessary for the following reasons:

(a) To produce a homogeneous stable liquid of high mobility and elasticity, (b) To convert the water content of the solution into volatile matter, (c) To reduce the alkalinity of the solution, and (d) To make the solution insensitive to frost.

This is accomplished by making an aqueous composition of basic or normal aluminum acetates, organic acids, polyhydric alcohol and saccharides of varying acidity, together with alkali metal silicate and stirring this composition at high speed until the coagulated components thereof are liquified. Any organic acids, sufficiently water-soluble to react with the free alkali of the alkali metal silicates, capable of reducing the alkalinity of the silicates may be employed.

The acidity of such composition may be adjusted to a pH value of 2.5 for the modification of sodium silicates between 33.5 to 41 degrees Baumé. An example of such a binding composition is the following:

*Example No. 1*

Tartaric acid or a combination of citric and lactic acids is dissolved in water and this acid solution adjusted to a pH of about 2.5 about 20 to 30 cc., of a solution glycol and about 30 cc. of a standard glucose syrup may be added to 1000 cc. of the acid solution and dissolved therein by stirring. About 400 to 450 cc. of the acid solution are stirred into 1000 cc. of sodium silicate of 33.5 degrees Baumé until a homogeneous composition is obtained having pH value of about 11. When using, for example, sodium silicates of 52 degrees Baumé, 1250 cc. of the aforesaid acid solution are mixed with about 1000 cc. of the silicate solution to result in a stable binding composition having a pH of about 11.05.

The resulting binding composition will have a consistency such that it may be readily applied with a trowel. This consistency is suitable for cementing applications or for use as mortar. However, in applications as given in the following Examples 4, 5, 6 and 7, where the solid phase is high, sodium silicate solutions of high alkalinity, for example, pH value below 2 are required. Also in order to further increase the solid phase aluminum acetate may be added to the binding composition as set forth in the following examples:

Example No. 2

|   | Cc. |
|---|---|
| Aluminum acetate, dissolved in water, pH 3.9 | 5,000 |
| Citric acid, USP, dissolved in water, pH 2.0 below | 2,000 |
| Lactic acid, technical 44% | 2,000 |
| Glycol | 300 |
| Technical glucose, 41 degrees Baumé, pH 2.0 | 800 |
| Total | 10,100 |
| The above five components are mixed and stirred and the composition resulting is mixed with sodium silicates of 52 degrees Baumé | 10,000 |
| | 20,100 |

The five components and the sodium silicated mixed together in the proportions given in Example 2, coagulate and form a strong gel which is liquified upon stirring under high speed for one hour or longer depending upon the quantities. The liquified composition represents the end product of 33 degrees Baumé, pH value 10.6, which is used as a binder in Examples 4, 5, 6 and 7.

Example No. 3

|   | Cc. |
|---|---|
| Aluminum acetate, dissolved in water, pH 3.9 | 3,500 |
| Tartaric acid, USP, dissolved in water, pH 2.0 below | 2,900 |
| Lactic acid, technical 44% | 2,900 |
| Glycol | 400 |
| Glucose, technical 41 degrees Baumé, pH 2.0 | 800 |
| Total | 12,500 |
| The above five components are mixed and stirred and the composition resulting is mixed with sodium silicate solution, 58.5 degrees Baumé | 10,000 |
| | 22,500 |

The five components and the sodium silicate mixed together in the proportions given in Example 3, coagulate and form a strong gel which is liquified upon stirring under high speed within one hour or longer depending upon the quantities. The liquified composition represents the end products of 39 degrees Baumé, pH 10.6, which may also be used as a binder in Examples 4, 5, 6 and 7.

The conversion of any type of aggregates into solid materials require incorporation of the binder to the aggregates and thorough mixing. The ratio of aggregate to binder depends upon the absorptive properties of the former. The admixture may be compressed into desired molds or rammed in situ into frames. The compressed or rammed products are solidified under temperatures, beginning at 150 degrees C. which may be increased after a period of several hours depending upon the size or volume of the product and upon the temperature at which it is to be used. Thus the products may be fired to the extent demanded by their service conditions. In other words: the strength of the products depends entirely upon the potentialities of the binder and not upon recrystallization as is the case with conventional products.

Many metallurgical processes require non-absorbent products, for example, crucibles in which the process is carried out. Such crucibles may be rendered non-absorbent to their metal contents by the application of two films of refractory coatings, including this binding composition, to the surfaces thereof. The coatings may be made by using finely divided aggregates in particles of dust size mixed with this binding composition to brush- and/or spray-consistency. For example, a crucible made from fused magnesite is coated with finely divided fused magnesite which is combined with this binding composition in brush or spray consistency and the whole heated to the extent required by service conditions.

Example No. 4

| | |
|---|---|
| Muscovite mica, finely divided gr | 1,000 |
| Binding composition from Example, one, two or three cc | 200 to 250 |

In this example refractories such as chrome ore or any of the mica group may be used in place of muscovite mica. These components are well mixed and the admixture rammed into frames in the form of a monolith to be solidified, as specified above, such mica monolith may be used to insulate additional monoliths of any type of refractory aggregates associated therewith which are constructed in the same frame and to such extent that wooden frames may be employed for the construction of monolith furnaces.

The admixture from Example 4 may be mechanically compressed into any shape and fired after solidification to about 1,000 degrees C. The end products thus produced using muscovite mica are resistant to electric stress and high temperatures so that they are suitable for insulation or dielectric material in aircraft including jet propelled aircraft. This material is also suitable for use as a fixation product for fission products and also as pit liners for atomic waste disposition.

Example No. 5

| | |
|---|---|
| Alumina, 99% gr | 9,000 |
| Binder (from Examples one, two or three) cc | 1,000 |

These components are well mixed and then they may be mechanically compressed in molds or rammed into frames and initially solidified at about 150 degrees C. End products are produced without evidence of fusion when heated to 1850 degrees C. They also have a high order of dimensional stability.

Calcined aluminum silicate and mullite may be used in this example instead of alumina. However, since these are more porous than alumina, the amount of binder used must be increased accordingly.

Example No. 6

| | |
|---|---|
| Fused magnesite gr | 5,000 |
| Binder (from Example one, two or three) cc | 250 |

These components are mixed as described under Example 4. After heating the products to 500 degrees C., two films of coatings of fused magnesite and binder as described above, may be applied. Reheating the product at 1100 degrees C., results in a product suitable for use as a crucible for casting and melting uranium and other metals.

Calcined magnesia may be used in place of fused magnesia and because it is more porous the amount of binder required is greater.

Example No. 7

| | |
|---|---|
| Silicon carbide gr | 45,400 |
| Binder (from Example one, two or three) cc | 2,700 |

Other carbides, such as, tungsten carbide, tantalum carbide, boron carbide and titanium carbide, etc., may be used in place of or mixed with silicon carbide if desired.

These components are mixed as in Example 4 and the product heated to 500 degrees C. The resulting product is thereafter coated with two coats of an admixture of finely divided silicon carbide and binder of brush or spray consistency and reheated to 1100 degrees C. This product is suitable for use as one or more coatings or films on sinker rolls operating in molten aluminum since it is resistant to the corrosive action of such molten metals. It may, of course, be used in numerous other applications where it is desired to protect surfaces and immunize them against errosion, especially at high temperatures.

From the foregoing specification and examples it will be apparent that I have provided a binding material that may be used not only for binding refractory aggregates for the purpose of making structures and articles of various shapes therefrom but also for the purpose of applying and binding films of finely divided refractory materials to surfaces of containers and furnaces used in metallurgical processes and also as coatings to be applied to electrical devices which are subjected to high temperatures.

I claim:

1. A liquid binding composition consisting essentially of a composition prepared by dissolving an organic acid selected from the class consisting of tartaric, citric and lactic acids in water to a pH of about 2.5, dissolving in about 1000 cc. of the resulting acid solution from about 20 to 30 cc. of a soluble polyhydric alcohol and about 30 cc. of a glucose syrup, and adding sufficient of the foregoing solution to a solution of sodium silicate of about 33.5° to 67.5° Baumé until a homogeneous composition having a pH value of about 10 to 12 is obtained, thereby obtaining a composition in which gelation is prevented for long periods of time when the composition is kept in a closed container.

2. A liquid binding composition consisting essentially of a composition prepared by dissolving aluminum acetate in water to a pH of about 3.9, dissolving an organic acid selected from the class consisting of tartaric, citric and lactic acids in water to a pH of about 2, mixing about 50 parts of the aluminum acetate solution with about 20 parts of said acid solution, with about 20 parts of 44% lactic acid solution, with about 3 parts of glycol and about 8 parts of 41° Baumé technical glucose, stirring the mixture resulting from said mixing, and adding sufficient of the foregoing mixture to a solution of sodium silicate of about 33.5° to 67.5° Baumé until a homogeneous composition having a pH value of about 10 to 12 is obtained, thereby obtaining a binding composition of brushing or spraying consistency in which gelation is prevented for long periods of time when the composition is kept in a closed container.

3. An article of manufacture comprising a binding composition prepared by dissolving an organic acid selected from the closs consisting of tartaric, citric and lactic acids in water to a pH of about 2, dissolving in about 1000 cc. of the resulting acid solution from about 20 to 30 cc. of a soluble polyhydric alcohol and about 30 cc. of a glucose syrup, and adding sufficient of the foregoing solution to a solution of sodium silicate of about 33.5° to 67.5° Baumé until a homogeneous composition having a pH value of about 10 to 12 is obtained, mixing an amount of said binding composition with refractory aggregate, the ratio of said binding composition to said refractory aggregate being determined by the absorptive property of said refractory aggregate, the resulting mixture being compressed, heated and fired to form a refractory monolith or shape.

4. A method of coating refractory material adapted for metallurgical processes to render such materials non-absorptive of molten metal comprising the steps of producing refractory material in the form of dust, mixing the dust with a binding composition of the type set forth in claim 1 to brush or spray consistency and applying the mixture with brush or spray to the surface of the refractory coming in contact with the molten metal.

5. A refractory material coating adapted for metallurgical furnaces and containers for melting metal comprising a refractory structure and anti-errosive coatings of acid or basic or neutral aggregates ball milled with a binder of the type set forth in claim 1 to brush consistency and applied to the surfaces of said refractory structure to render said surfaces non-absorbent of molten meal.

6. The method of manufacturing refractory material shapes comprising the steps of finely dividing a refractory material, mixing said finely divided material with a binding composition of the type set forth in claim 2, stirring the mixture so produced, shaping the mixture to the desired shape and heating the shaped mixture to solidify same.

References Cited in the file of this patent

UNITED STATES PATENTS

| | | |
|---|---|---|
| 1,357,844 | Cavanaugh | Nov. 2, 1920 |
| 2,322,274 | Birch et al. | June 22, 1943 |

OTHER REFERENCES

Chemical and Metallurgical Engineering, vol. 31, No. 18, pp. 696–698; November 3, 1924.